United States Patent [19]

Head, Jr. et al.

[11] Patent Number: 4,700,641

[45] Date of Patent: Oct. 20, 1987

[54] PIVOTING SPRING-CUSHIONED PRESS WHEEL GANG ASSEMBLY

[75] Inventors: Glenn D. Head, Jr., Des Moines; Jeffrey J. Postal, Ankeny, both of Iowa

[73] Assignee: Deere & Company, Moline, Ill.

[21] Appl. No.: 828,002

[22] Filed: Feb. 7, 1986

[51] Int. Cl.⁴ .................... A01C 5/00; A01B 49/00
[52] U.S. Cl. .................... 111/85; 172/310; 172/631
[58] Field of Search ............ 111/54, 55, 69, 88, 111/71, 66, 59, 14, 67, 52 WT, 85, 52; 172/314, 310, 311, 179, 619, 624, 538, 569, 584, 586, 595, 596, 600–601

[56] References Cited

U.S. PATENT DOCUMENTS

| 779,143 | 1/1905 | Van Brunt | 111/85 X |
|---|---|---|---|
| 1,020,681 | 3/1912 | Binns | 111/52 |
| 1,021,379 | 3/1912 | Schutt | 111/54 |
| 1,233,760 | 7/1917 | Dickinson | 111/52 |
| 2,323,044 | 6/1943 | Hyland | 111/54 |
| 2,496,885 | 2/1950 | Milton | 111/85 |
| 2,798,419 | 7/1957 | Moriceau | 172/584 X |
| 2,833,231 | 5/1958 | Dahlinghaus | 111/14 |
| 2,947,372 | 8/1960 | Olson | 111/66 X |
| 3,117,541 | 1/1964 | Todd et al. | 111/54 |
| 3,118,506 | 1/1964 | Morris | 111/85 X |
| 3,391,663 | 7/1968 | Cagle et al. | 111/52 |
| 4,170,265 | 10/1979 | Cole | 172/600 |
| 4,519,460 | 5/1985 | Gust | 111/85 |
| 4,528,920 | 7/1985 | Neumeyer | |

FOREIGN PATENT DOCUMENTS

| 123046 | 1/1947 | Australia | 111/69 |
|---|---|---|---|
| 2220162 | 10/1973 | Fed. Rep. of Germany | 172/311 |

Primary Examiner—Robert A. Hafer
Assistant Examiner—Danton DeMille

[57] ABSTRACT

Press wheel gangs are pivotally connected to an implement frame by an upright pivot bracket which permits each gang to rock about both a fore-and-aft extending axis and an axis transverse to the forward direction. A pivot at the lower end of the bracket and above the forward central portion of the gang permits the gang to rock about the fore-and-aft axis to move over small obstacles and uneven terrain. The entire gang can rock upwardly about the transverse axis over larger obstacles or extremely rough terrain to eliminate extreme stressing of the gang press wheels and to assure uniform soil-firming characteristics. A compression spring assembly connected between the frame and the upper end of the bracket yieldingly biases the gang into soil-firming relationship with the ground.

16 Claims, 4 Drawing Figures

PIVOTING SPRING-CUSHIONED PRESS WHEEL GANG ASSEMBLY

BACKGROUND OF THE INVENTION

This invention relates generally to seeding implements such as grain drills, and more specifically, to press wheel structure for such implements.

Press wheel types of grain drills utilize gangs of press wheels mounted in trailing relationship to furrow openers for firming the soil over seed to assure good soil-seed contact. To help provide better and more uniform firming action over slightly irregular field surfaces, some grain drills such as the John Deere 9000 series Press Wheel Grain Drill utilize pivoting gangs of press wheels. Each gang is pivotally connected to the implement frame by a fore-and-aft extending pivot located above the gang. Although the pivotal connection permits each gang to work relatively independently over contours and to pack the soil more uniformly than a fixed press wheel gang assembly, it does not permit the press wheels located directly under the pivot to move vertically with respect to the frame. When these press wheels closely adjacent the pivot encounter an obstruction, the entire implement frame may be lifted and supported on one or two of the press wheels. This severely stresses the press wheels and allows the machine to be raised out of the ground, interrupting seed placement. Therefore, although the present pivot arrangement works well for small obstructions and slight ground nonuniformities, larger obstructions, particularly when encountered near the pivot location, can adversely affect the planting characteristics of the drill.

OBJECTS OF THE INVENTION

It is therefore an object of the invention to provide an improved press wheel gang assembly for an implement such as a grain drill. It is a further object to provide such an assembly which overcomes the aforementioned problems.

It is still another object of the invention to provide an improved press wheel gang assembly which is more flexible than at least most prior art press wheel assemblies. It is another object to provide such an assembly which is better able to accommodate larger obstructions and ground nonuniformities without substantially deteriorating planting characteristics than at least most of the prior art press wheel assemblies.

It is still another object of the invention to provide a pivoting press wheel gang assembly which is rockable about a fore-and-aft extending pivot located above the press wheels for accommodating small obstructions and slight ground nonuniformities, and which also includes structure to allow the gang of wheels to move up and to the rear when larger obstructions or ground irregularities are encountered to keep the wheels in contact with the ground for uniform firming action of the soil.

It is a further object of the present invention to provide an improved press wheel gang assembly having increased flexibility and better soil-firming characteristics on an uneven terrain than at least most prior art press wheel gang assemblies. It is a further object to provide such an assembly which is stable and which does not require complicated equalizer bars or large, cumbersome spring arrangements.

BRIEF DESCRIPTION OF THE INVENTION

In accordance with the above objects, a gang of press wheels is connected to the frame of a grain drill or the like by a pivoting arrangement which permits the gang to pivot about both a transverse axis and a fore-and-aft extending axis. An upright pivot bracket is connected to the frame for pivoting about the transverse axis. The lower end of the bracket supports a fore-and-aft extending pivot which in turn supports the press wheel gang. The fore-and-aft pivot permits the press wheel gang to rock so the wheels can move vertically with respect to each other over small obstructions. If a larger obstruction is encountered, particularly by the wheels immediately below the fore-and-aft pivot, the entire press wheel gang can rock upwardly about the transverse pivot so the wheels can clear the obstacle without lifting the implement frame and without putting undue stress on one or more of the press wheels. The upper end of the pivot bracket is connected to a compression spring assembly including a saddle arrangement which moves in the fore-and-aft direction as the press wheel gang rocks about the transverse axis. The spring assembly permits a relatively high spring force without use of large or multiple springs. Stops on the bracket limit the amount the gang assembly can pivot about the fore-and-aft axis, and the axes are so located with respect to each other and to the gang axle to provide stable operation for constantly good soil-firming action even in rough or uneven terrain.

DESCRIPTION OF THE PREFERRED EMBODIMENT

Figure 1:
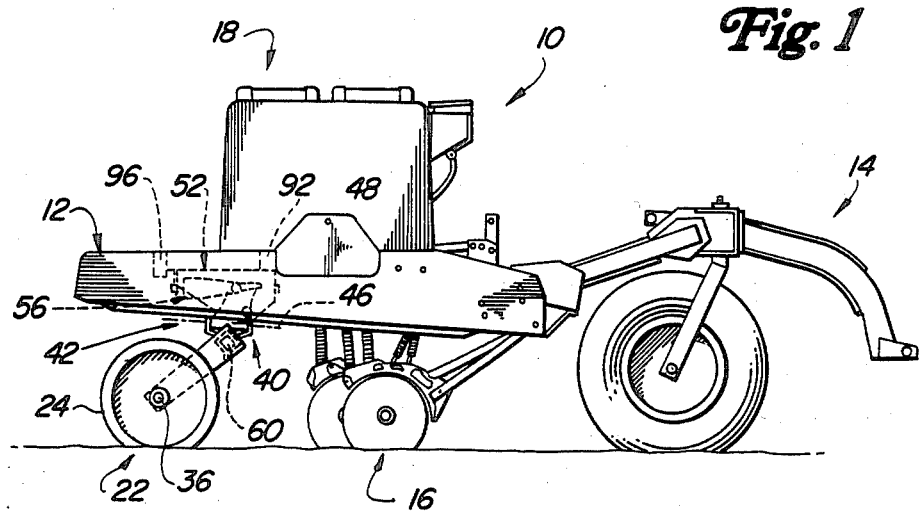
FIG. 1 is a side view of a grain drill with the press wheel assembly of the present invention attached thereto.

Referring now to FIG. 1, there is shown a grain drill 10 having a main frame 12 and adapted for towing in the forward direction over a field by a towing vehicle (not shown) connected to hitch structure 14. Conventional opener assemblies 16 are transversely spaced on the main frame 12 for opening a furrow and depositing seed from a grain storage area 18 into the furrows. A plurality of press wheel gang assemblies 22 are supported adjacent the aft end of the main frame 12 and include individual press wheels 24 adapted for engaging the soil directly behind the opener assemblies 16 to compact the soil around the deposited seed to assure fast, even seed germination.

Figure 2:
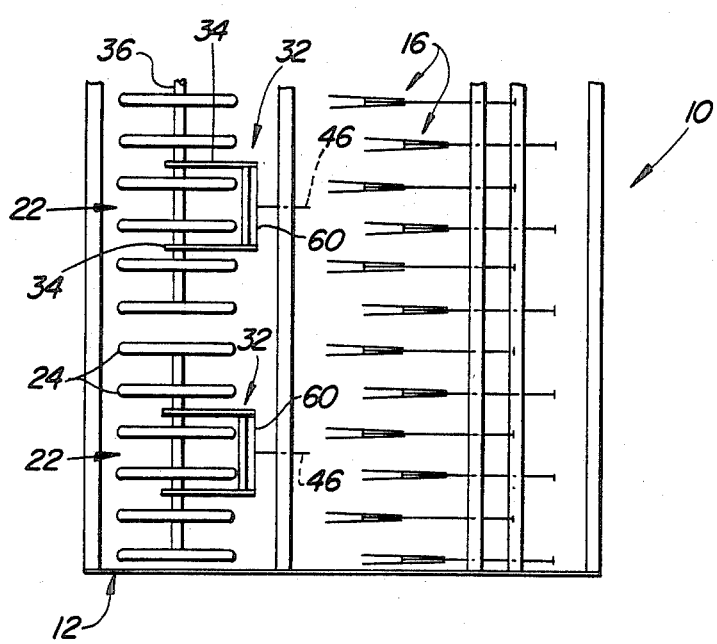
FIG. 2 is a schematic top view of the right rear portion of the grain drill shown in FIG. 1 and generally illustrating the arrangement of the press wheels across the width of the machine.
Figure 3:
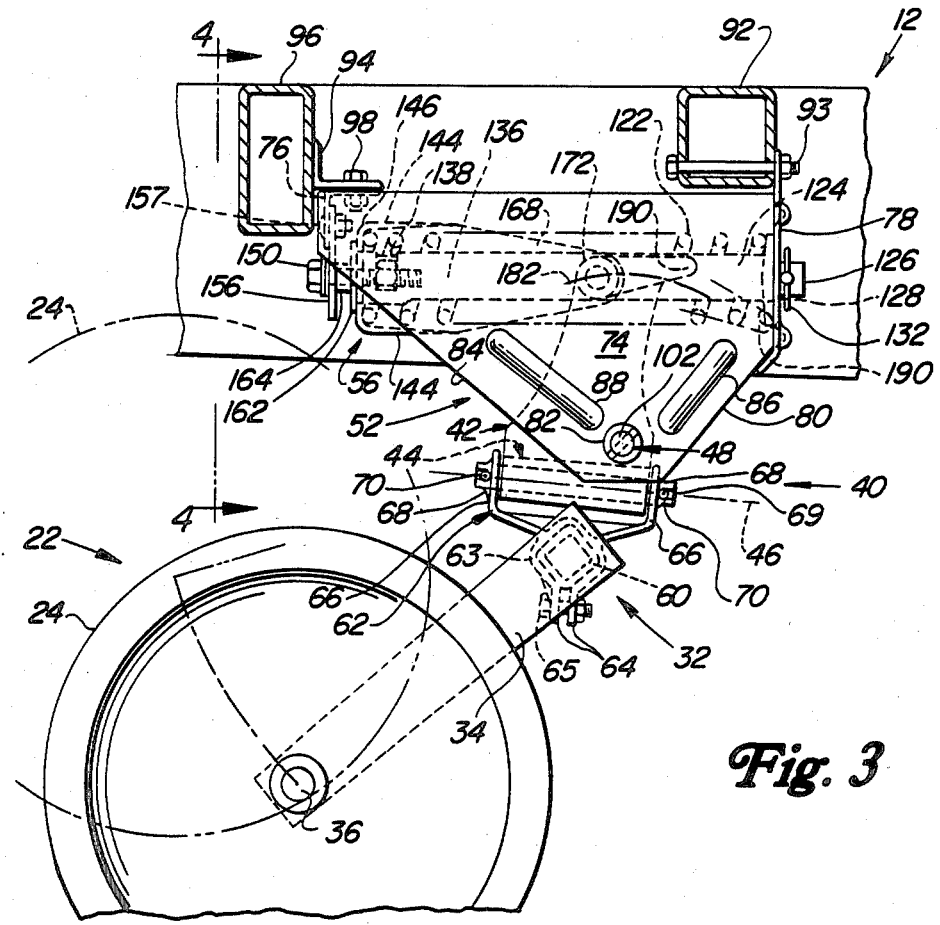
FIG. 3 is an enlarged side view of the press wheel assembly of FIG. 1 showing the assembly in the normal field-working position (solid lines) and rocked about the fore-and-aft axis over a large obstruction (broken lines).
Figure 4:
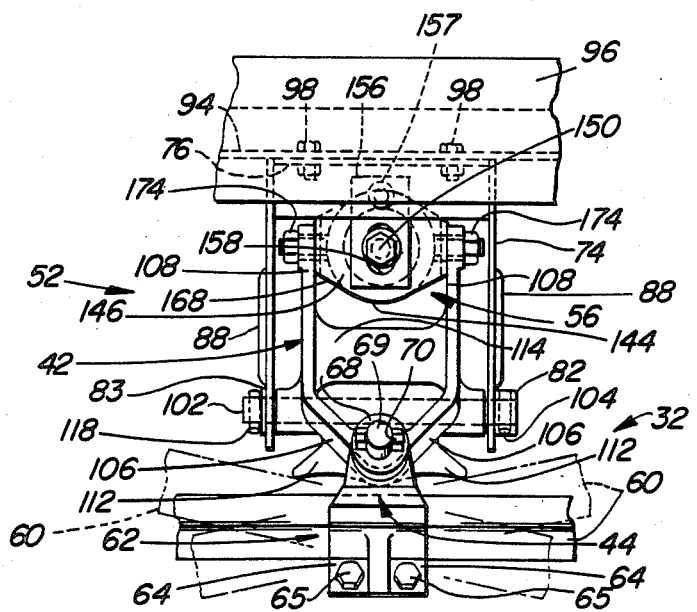
FIG. 4 is a rear view of the bracket structure taken generally along lines 4—4 of FIG. 3.

Each press wheel gang assembly 22 includes a transversely extending gang frame 32 (FIGS. 2-4) with downwardly and rearwardly directed standards 34 supporting an axle 36 which rotatably mounts a plurality of the press wheels 24 for rotation about a generally horizontal transverse axis. The gang frame 32 in turn is connected to a support assembly indicated at 40 which includes an upright pivot bracket 42 having lower fore-and-aft extending pivot structure 44 mounting the gang frame 32 for rocking with respect to the bracket 42 about a fore-and-aft extending axis 46. The pivot bracket 42 is connected for rocking with respect to the main frame 12 by a transverse pivot 48 carried by support structure 52 fixed to the frame. The upper end of the pivot bracket 42 is connected to a compression spring assembly 56 to bias the structure 42 about the transverse pivot 48 in a direction (counterclockwise in FIGS. 1 and 3) to yieldingly urge the press wheels 24 downwardly into soil-firming relationship with the ground. The fore-and-aft pivot 44 permits the press wheel gang axle 36 to rock in an upright plane which passes through the axle 36 perpendicular to the axis 46. The transverse pivot 48 permits the press wheel gang 22 to rock from a normal field-working position (solid lines of FIG. 3) upwardly against the bias of the compression spring assembly 56 toward a fully tripped position (broken lines of FIG. 3) when large obstacles or large surface irregularities are encountered, particularly by the press wheels closest to the fore-and-aft pivot structure 44.

The gang frame 32 includes a transverse tubular beam 60 located forwardly and above the gang axle 36, and directly above the front extremities of the press wheels 24. The beam 60 is rockably connected to the upright pivot bracket 42 by a connecting yoke 62 having a lower end 63 adapted to conform to the shape of the tubular beam 60. Opposed projections 64 extending downwardly from the lower end 63 include apertures for receiving bolts 65 which are tightened against the projections 64 to secure the beam 60 within the lower end 63. The connecting yoke 62 includes upper fore-and-aft spaced side legs 66 which embrace the opposite ends of the pivot area 44 of the upright pivot bracket 42. In the preferred embodiment, the connecting yoke 62 is cast from nodular iron and includes reinforced aperture areas 68 on the opposed side legs 66 which are aligned with the ends of the pivot area 44. A pivot pin 69 is inserted through the reinforced aperture area and through the pivot area 44 to mount the connecting yoke 62 for rocking about the axis 46. Pins 70 are inserted through apertures in the ends of the pivot pin 69 and through notches 71 in the reinforced aperture area 68 to secure the pivot pin 69 in position and to prevent relative rocking of the pivot pin with respect to the side legs 66.

The support structure 52 which carries the upright pivot bracket 42 is generally channel shaped and opens downwardly and rearwardly in the direction of the supported press wheel gang assembly 22. The structure 52 includes downwardly directed side plates 74 connected by an upper, horizontal angle 76 and a front vertical plate 78 welded between the forward edges of the side plates 74. The side plates 74 each have a front edge 80 extending downwardly and rearwardly from the front plate 78 toward a reinforced pivot support area, indicated generally at 82 and 83. The aft edges of the plates 74 extend rearwardly and upwardly from the pivot areas 82 and 83 to connections with the angle 76. Reinforcing ribs 86 and 88 extend generally parallel to the edges 80 and 84, respectively, generally in line with the reinforced pivot areas 82 and 83. The front plate 78 extends upwardly above the top edges of the side plates 74 and is connected to a transverse beam 92 of the main frame 12 by a bolt 93. An angle 94 is attached to the rear face of a rear transverse beam 96 of the main frame 12 and bolts 98 are inserted through the horizontal flange of the angle 94 and through the angle 76 to secure the aft end of the support structure 52 to the main frame 12.

The upright pivot bracket 42 is secured between the side plates 74 for rocking about a transverse axis by a pivot pin 102 which is inserted through the transverse pivot 48 and through the reinforced pivot areas 82 and 83 at the lower end of the side plates 74. The reinforced pivot area 82 is apertured to align with an aperture at the end of the pin 102 and a locking pin 104 is inserted through the pivot area 82 and the aperture and the pin 102 to prevent the pin 102 from rocking in the pivot areas 82 and 83. In the preferred embodiment, the upright pivot bracket 42 is a unitary structure cast from nodular iron and includes connecting portions 106 extending upwardly and outwardly from the fore-and-aft pivot structure 44 to the transverse pivot 48. Upright side legs 108 extend upwardly from the pivot 48 inwardly adjacent the side plates 74 to a connection with the compression spring assembly 56. Ears 112 project outwardly and slightly downwardly (FIG. 4) from the connecting portions 106 and the pivot structure 44 for contacting the tubular beam 60 to prevent the press wheel gang assemblies 22 from rocking beyond a preselected acute angle with respect to the horizontal. A reinforcing rib 114 located directly above the transverse pivot 48 extends between the upright side legs 108 to provide extra strength and rigidity for the bracket 42. A second locking pin 118 is inserted through the left end (FIG. 4) of the pivot pin 102 to help maintain the pin in proper location.

The compression spring assembly 56 includes a single coil spring 122 carried on a spring guide 124 having a forward end 126 extending through an upright slot centrally located in the front plate 78. An enlarged end 128 bears against the rearwardly facing surface of the front plate 78 and a pin 132 extends through the end 126 to secure the spring guide 124 longitudinally with respect to the frame. The guide 124 extends rearwardly to an aft end 136 and includes a nut-capturing cavity 138 which supports a nut 140. A saddle bracket 144 is slidably received over the spring guide 124 and includes a rounded bight portion 146 bearing against the aft end of the compression spring 122. A bolt 150 is threaded into the captive nut 140. An upright slotted bracket 156 is connected by a bolt 157 to the angle 76 and has an upright slot 158 generally aligned with the axis of the compression spring 122. The bolt 150 extends through a flat washer 162 which bears against the bight portion 146 of the saddle bracket 144 and a cylindrical spacer 164 bears against the headed end of the bolt 150 and the flattened washer 162 to maintain the compression spring on the spring guide 124 and to provide a selected precompression of the spring 122. The bolt 150 and the spacer 164 extend through the slot 158 of the upright bracket 156 to hold the spring bracket assembly in a generally horizontal attitude. The saddle bracket 144 includes side legs 168 extending forwardly from the bight portion 146 on either side of the compression spring 122. The forward ends of the side legs 168 are apertured at 172 and extend inwardly adjacent the upper ends of the upright side legs 108 which are also apertured. The apertured ends 172 are pivotally connected to the upper ends of the upright side legs 108 by a pair of bolts 174.

The spring 122 biases the pivot bracket 42 in the counterclockwise direction (FIG. 3) about the transverse pivot 48 to urge the press wheel gang assembly 22 downwardly so that the press wheels 24 engage the soil to firm the soil around the planted seeds. The compression spring 122 is selected such that an initially high trip force is provided so that under normal conditions where only small obstacles or slightly uneven terrain are encountered, the press wheel assembly 22 will remain generally in the fully counterclockwise position, and the pivoting of the assembly 22 about the fore-and-aft axis 46 will accommodate the obstacles or variations in surface contour. However, if a large obstacle or extreme surface irregularity is encountered, or an obstacle contacts the press wheel or wheels 24 directly below the pivot 44, the pivot bracket 42 will pivot in the clockwise direction causing the saddle bracket 144 to slide over the spring guide 124 and compress the spring 122 to relieve the gang assembly 22 from excess forces that would otherwise raise the main frame 12 or damage the press wheels 24 encountering the obstacle. Once the obstacle is cleared, the compression spring 122 will expand to force the saddle bracket 144 to the left as viewed in FIG. 3 and rotate the bracket structure 42 in the counterclockwise direction.

In the preferred embodiment, the pivot bracket 42 is fabricated as a casting from nodular iron with the fore-and-aft pivot 44 located directly below the transverse pivot 48. The forward extremities of the press wheels 24 when in the normal field-working position are located directly below the pivot 44, and a transversely extending vertical plane touching the forward extremities of the press wheels intersects the pivot 44. The press wheel gang is approximately centered (FIG. 2) in the transverse direction with respect to the axis 46. The pivotal connections 174 of the saddle bracket side legs 168 with the upright side legs 108 are located slightly rearwardly of a vertical plane passing through the transverse pivot 48 when the saddle bracket 144 abuts the washer 162. As the gang assembly 22 rocks upwardly against the bias of the spring 122 to its fully tripped position (broken lines of FIG. 3) the pivotal connections 174 move through an arc indicated at 182 of FIG. 3 from a first position generally aligned with the axis of the spring 122 through a position slightly above the axis and downwardly when the spring is fully compressed to a position slightly below the axis. The construction provides a generally flat and horizontal straight-line pull of the saddle bracket 144 from the normal working position through to the fully tripped position. The moment arm defined by the distance between the gang axle 36 and the transverse pivot 48 is substantially greater than the moment arm defined by the distance between the transverse pivot 48 and the pivotal connections 174. Therefore, a relatively small movement of the saddle bracket 144 translates into a considerably larger upper and slightly rearward component of motion of the gang frame axle 36. The compression spring assembly 56 provides the most effective use of the coil spring 122 so that a large trip force with good trip height is maintained without multiple or very large springs. The compact arrangement of the pivot bracket 42 and the pivot structures 44 and 48 with the forward end of the press wheels 24 located below the pivot 44 provide a sturdy arrangement which provides two degrees of freedom while preventing instabilities that might otherwise occur on sloping and uneven terrains.

To prevent the press wheel gang assembly 22 from pivoting upwardly beyond a preselected position about the transverse pivot 48, forwardly extending ears 190 are provided adjacent the pivotal connections 174 to contact the front plate 78 of the support assembly 40. Therefore, if a very large obstacle is encountered by the gang assembly 22, or the terrain urges the assembly toward an extreme pivoted position, the ears 190 will contact the plate 78 to prevent the gang assembly from pivoting beyond the preselected position.

Having described the preferred embodiment, it will be apparent that modifications can be made without departing from the scope of the invention as defined in the accompanying claims.

We claim:

1. In a framed seeding implement adapted for forward movement over the ground and having means for forming a plurality of seed-receiving furrows and depositing seed therein, press wheel structure for firming soil around the deposited seed comprising:

a gang of transversely spaced press wheels;

means for supporting the press wheel gang from the frame in trailing relationship to the furrow-forming means, said means for supporting including first means for permitting the press wheel gang to pivot vertically with respect to the frame about a generally horizontal and transverse axis and second means for permitting the press wheel gang to rock about a generally fore-and-aft extending axis so that the press wheels can move vertically with respect to each other over obstacles;

means for yieldingly biasing the press wheel gang about the transverse axis into soil-firming relationship with the ground; and wherein said first means comprises a bracket pivotally connected to the implement frame for rocking about the transverse axis, said second means including fore-and-aft extending pivot structure connecting the press wheel gang to the bracket for permitting the gang to rock freely about the fore-and-aft axis with respect to the bracket, said fore-and-aft extending pivot structure located closely adjacent the transverse axis and wherein a transverse vertical plane containing said transverse axis passes through the pivot structure.

2. The invention as set forth in claim 1 wherein the means for biasing comprises a compression spring assembly connected between the implement frame and the bracket.

3. The invention as set forth in claim 2 wherein the bracket is upright and carries the fore-and-aft pivot structure offset vertically to one side of the transverse axis, said bracket including a spring assembly connecting portion offset to the opposite side of the transverse axis.

4. The invention as set forth in claim 3 wherein the compression spring assembly includes a horizontal compression spring having a central axis, a saddle bracket including a bight portion bearing against one end of the spring and side legs extending from the bight portion generally parallel to the central axis towards the opposite end of the spring, and means for pivotally connecting the spring assembly connecting portion to the side legs adjacent the central axis.

5. The invention as set forth in claim 4 including means for limiting the rocking of the bracket about the transverse axis between first and second positions, said first position corresponding to a normal field-working position of the gangs wherein the spring is in an expanded state, and a second fully tripped position wherein the gang is rocked upwardly and the spring is substantially fully compressed.

6. The invention as set forth in claim 1 wherein the bracket includes stop means for limiting the rocking of the gang about the fore-and-aft axis.

7. The invention as set forth in claim 6 wherein the stop means includes transversely extending projections for contacting the press wheel gang.

8. In a seeding implement having a frame and adapted for towing forwardly over the ground, a press wheel gang assembly comprising:
  a press wheel gang including a plurality of press wheels, a gang frame, and means rotatably supporting the press wheels from the gang frame in transversely spaced relationship;
  support assembly means for rockably connecting the press wheel gang to the implement frame, said support assembly means including an upright pivot bracket, transverse pivot means pivotally connecting the bracket for rocking with respect to the implement frame about a transverse axis, said upright pivot bracket including fore-and-aft pivot structure located adjacent the transverse pivot means, and means pivotally connecting the gang frame to the fore-and-aft pivot structure for permitting the ends of the gang frame to rock up and down with respect to each other;
  means biasing the pivot bracket about the transverse axis for urging the press wheels downwardly with respect to the ground; and
  wherein the fore-and-aft pivot structure is located immediately below the transverse pivot means and is intersected by a vertical plane which touches the forwardmost extremities of the press wheels when the press wheels are in the downwardly urged position.

9. The invention as set forth in claim 8 wherein the transverse axis is located adjacent but slightly forwardly of the vertical plane.

10. The invention as set forth in claim 8 wherein the fore-and-aft pivot structure is centrally located with respect to the transverse dimension of the press wheel gang.

11. The invention as set forth in claim 8 including a support assembly comprising a channel-shaped bracket having upright side plates, means for connecting the channel-shaped bracket to the implement frame with the side plates extending downwardly from the frame, means for supporting the transverse pivot between the lower ends of the side plates, a compression spring supported between the upper ends of the side plates, wherein said pivot bracket includes upright side legs extending upwardly to a location adjacent the compression spring, and means connecting the pivot bracket side legs to the compression spring for compressing the spring as the press wheel gang rocks upwardly about the transverse pivot.

12. The invention as set forth in claim 11 including fore-and-aft extending spring guide means for supporting the spring in a generally horizontal attitude within the channel-shaped bracket.

13. In a seeding implement having a frame and adapted for towing forwardly over the ground, a press wheel gang assembly comprising:
  a press wheel gang including a plurality of press wheels, a gang frame, and means rotatably supporting the press wheels from the gang frame in transversely spaced relationship;
  support assembly means for rockably connecting the press wheel gang to the implement frame, said support assembly means including an upright pivot bracket, transverse pivot means pivotally connecting the bracket for rocking with respect to the implement frame about a transverse axis, said upright pivot bracket including fore-and-aft pivot structure located adjacent the transverse pivot means, and means pivotally connecting the gang frame to the fore-and-aft pivot structure for permitting the ends of the gang frame to rock up and down with respect to each other;
  means biasing the pivot bracket about the transverse axis for urging the press wheels downwardly with respect to the ground; and
  wherein the upright pivot bracket includes outwardly projecting ears for contacting and limiting the rocking of the press wheel gang about the fore-and-aft pivot axis.

14. In a seeding implement having a frame and adapted for towing forwardly over the ground, a press wheel gang assembly comprising:
  a press wheel gang including a plurality of press wheels, a gang frame, and means rotatably supporting the press wheels from the gang frame in transversely spaced relationship;
  support assembly means for rockably connecting the press wheel gang to the implement frame, said support assembly means including an upright pivot bracket, transverse pivot means pivotally connecting the bracket for rocking with respect to the implement frame about a transverse axis, said upright pivot bracket including fore-and-aft pivot structure located adjacent the transverse pivot means, and means pivotally connecting the gang frame to the fore-and-aft pivot structure for permitting the ends of the gang frame to rock up and down with respect to each other;
  means biasing the pivot bracket about the transverse axis for urging the press wheels downwardly with respect to the ground; and
  said support assembly means further comprising a channel-shaped bracket having upright side plates, means for connecting the channel-shaped bracket to the implement frame with the side plates extending downwardly from the frame, means for supporting the transverse pivot between the lower ends of the side plates, a compression spring supported between the upper ends of the side plates, wherein said pivot bracket includes upright side legs extending upwardly to a location adjacent the compression spring, and means connecting the pivot bracket side legs to the compression spring for compressing the spring as the press wheel gang rocks upwardly about the transverse pivot.

15. The invention as set forth in claim 14 including fore-and-aft extending spring guide means for supporting the spring in a generally horizontal attitude within the channel-shaped bracket.

16. The invention as set forth in claim 14 wherein the upright pivot bracket includes outwardly projecting ears for contacting and limiting the rocking of the press wheel gang.

* * * * *